United States Patent

[11] 3,617,621

[72] Inventor Larry Allen Cochran
Indianapolis, Ind.
[21] Appl. No. 20,311
[22] Filed Mar. 17, 1970
[45] Patented Nov. 2, 1971
[73] Assignee RCA Corporation

[54] COLOR COMPENSATING CIRCUITS
12 Claims, 1 Drawing Fig.

[52] U.S. Cl. 178/5.4 HE
[51] Int. Cl. H04n 9/12
[50] Field of Search 178/5.4, 5.4 HE

[56] References Cited

UNITED STATES PATENTS

| | | | |
|---|---|---|---|
| 2,888,514 | 5/1959 | Pritchard | 178/5.4 HE |
| 3,301,945 | 1/1967 | Dietch | 178/5.4 |
| 3,457,362 | 7/1969 | Mackey et al. | 178/5.4 |

*Primary Examiner*—Richard Murray
*Attorney*—Eugene M. Whitacre

ABSTRACT: A color television receiver includes color-compensating circuitry which tends to reproduce flesh tones more accurately in the presence of spurious phase errors of the color burst relative to the color subcarrier. The receiver may be operated in the usual manner, or by throwing a switch, color compensation is achieved by causing a change in the demodulation axis of the color demodulators and simultaneously reducing the color temperature of the kinescope.

PATENTED NOV 2 1971 3,617,621
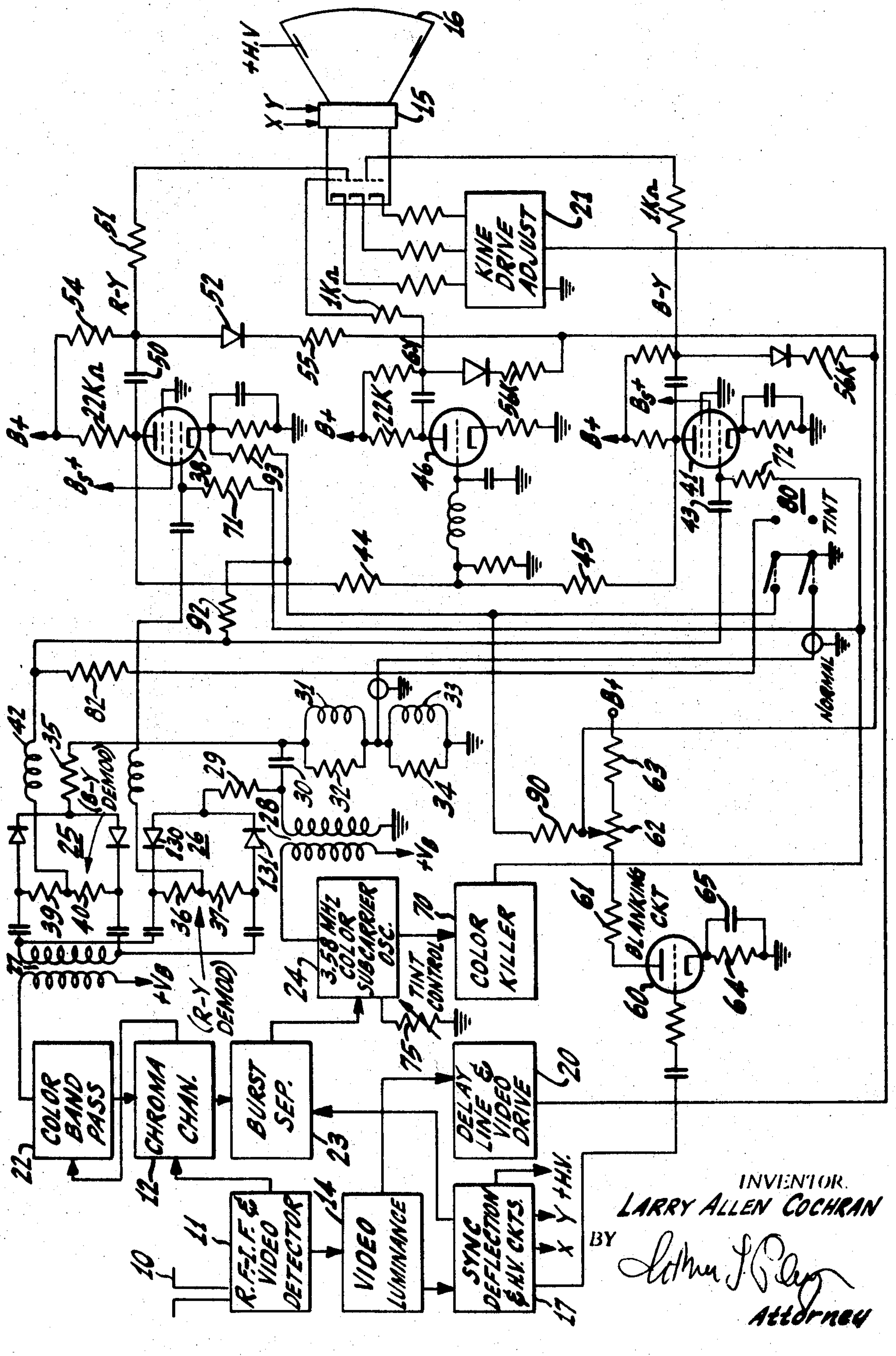
INVENTOR.
LARRY ALLEN COCHRAN
BY
Attorney

COLOR COMPENSATING CIRCUITS

This invention relates to color television receivers and more particularly to a technique and apparatus for providing compensation in the hue reproduction for a color television receiver display.

In the present day system of transmitting television signals, which is commonly referred to as the NTSC broadcast system, certain phase errors can and do exist in the color information which cause incorrect reproduction of the colors displayed on the face of a color kinescope. Such errors may be caused by disturbances in the propagation path between the transmitter and receiver or may exist in the particular type of equipment utilized for transmitting the composite television signal. At the receiver one can correct for certain errors by readjusting the phase of the local reference oscillator via a circuit commonly referred to as the tint control. In most conventional receivers the tint control is a manual adjustment provided for the convenience of the consumer viewing the broadcasted program. Due to such errors in phase which may exist between different stations or between different cameras at the same station, a viewer would constantly be required to adjust his tint control when such propagation errors occur. Hence, the prior art provides a number of techniques for providing tint correction by utilizing schemes which attempt to compensate for phase errors about the flesh tone axis or the I-axis. Such techniques consider that the NTSC signal is formulated from a luminance component and amplitude modulated I and Q-axis carriers. The human eye has maximum visual acuity to colors which fall along the I-axis and minimum visual acuity to colors which fall along the Q-axis. Consequently, a phase error in the burst-synchronizing information, which is used to lock the reference oscillator at the receiver, will cause the greatest apparent distortion to colors which fall along the I-axis. However, the information causing distortion in the flesh tone reproduction due to transmission phase errors is Q-axis information. Hence, a reduction in the Q-channel gain of the receiver tends to improve flesh tone reproduction when phase errors are present. The design engineer can select the relative gain of his demodulators and by selecting proper matrixing values and angles of demodulation obtain an effective reduction in the Q-channel gain. By effecting the gain of the Q-channel, the information transmitted which falls near the Q-axis will be distorted. However, this distortion is more tolerable than I-axis distortion. A reasonable compromise between distortion effects in the I and Q-channels is achieved by approximately a 50 percent gain reduction in the receiver Q-channel. While the half-Q-approach tends to give an improvement in the reproduction of the flesh tone, there is a problem due to the loss of information in reproducing green tones. Most color TV observers would notice that during a poor phase transmission, flesh tones may actually appear with a green or purple or some other tint cast on the viewing screen of the kinescope. The reduction of the Q-signal and hence the loss of Q-information results in a more pleasant flesh tone with less undesired, interfering tint. However, the reduction of Q-information results in a poorer capability of the television receiver in displaying green tones which in a reduced Q-system tend to appear blue.

It is therefore an object of the present invention to provide an improved tint system for furnishing an improved reproduction of both flesh tones and color tones.

A further object is to provide an improved tint correction system whose operation can be selected according to the preferences of the viewer.

In one embodiment of the present invention a color television receiver is adapted to respond to a transmitted, modulated television signal having luminance, chrominance and synchronizing information, said receiver having a conventional luminance channel for responding to and amplifying the luminance information and a chrominance channel for processing the chrominance information, and for retrieving a burst reference signal transmitted with said television signal. The receiver includes means for applying the burst signal to an oscillator source to synchronize the same to said burst. The oscillator signal is conventionally applied at a different phase to at least two demodulator circuit inputs. Each of the demodulators has another input responsive to the processed chrominance signals. Accordingly, the demodulators provide first and second signals at their outputs representative of at least first and second color signals. The receiver also includes a kinescope responsive to the luminance information and the demodulated color signals to provide a display at a given color temperature determined by the biasing on the kinescope electrodes. The invention includes circuit means coupled to the demodulators and operative during a color transmission for altering the characteristics of the demodulators to affect the output of at least one of them. Simultaneously, with this action, means are included in the receiver for lowering the color temperature of the kinescope by altering the bias on said electrodes according to a predetermined desired color temperature shift.

These and other objects of the present invention will become clearer if reference is made to the foregoing specification when read in conjunction with the accompanying FIGURE in which is shown a circuit diagram, partly in block form, of a color television receiver utilizing a tint control network according to the principles of this invention.

Referring to the FIGURE there is shown a block diagram of a color television receiver employing a tint control network according to this invention.

A transmitted composite television signal is intercepted by an antenna 10 which is coupled to a conventional tuner and intermediate frequency (IF) amplifier and video detector 11. The intermediate frequency signal is detected by means of video detector to provide a video information signal. The video signal is routed to two separate channels referred to as a chrominance channel 12 and a video or a luminance channel 14. The signal in the video channel is utilized to provide the synchronizing components for the horizontal and vertical deflection generators which are necessary to develop deflection signals for the yoke 15 associated with the color kinescope 16. The deflection generators, such as the horizontal section in particular, are also used to provide the necessary high-voltage levels for operating and biasing the appropriate electrodes of the kinescope 16, which is a three-gun shadow mask device.

The video signal is further applied to video amplifier circuitry 20 which functions to delay the luminance components and to amplify them to a suitable level necessary to drive the cathode electrodes of the kinescope 16. Interposed in the luminance path are kinescope drive adjust circuits 21 to further enable proper signal drive levels for each of the three cathodes associated with the kinescope 16.

As indicated, the video signal is also directed to the chrominance channel 12 for processing and amplifying the high frequency narrow band chrominance components contained in the video signal and representative of the color information transmitted. The chrominance channel comprises a series of one or more color bandpass or chrominance band-pass amplifiers designated by numeral 22. In order to demodulate the chrominance information, as transmitted, for providing the necessary color difference signals, an output of a chrominance amplifier is coupled to the input of a circuit referred to as the burst separator circuit 23. Such a circuit 23 is gated on during horizontal retrace interval for separating out from the composite signal the reference color burst signal which is transmitted on the back portion of the horizontal synchronizing component. The retrieved burst signal is representative of the frequency and phase of the oscillator signal used at the transmitter to provide the color subcarrier components. The retrieved burst is injected or otherwise coupled to a crystal-controlled color subcarrier reference oscillator 24. Oscillator 24 provides a continuous wave output synchronized to the incoming or received burst signal.

Color difference signals are provided by means of demodulators 25 and 26. Each demodulator as shown utilizes a two-diode circuit and has applied thereto at one input the chrominance subcarrier components These components are shown supplied to the demodulators 25 and 26 via the transformer 27 coupling the output of the band-pass amplifier 22 to the inputs of the respective demodulators. The other input to each demodulator is furnished by the output of the chrominance subcarrier oscillator 24 which drives the transformer 28. In order to demodulate the chrominance sidebands at the proper angle with respect to the carrier to obtain the B–Y and R–Y color difference signals, a different phase of the reference subcarrier oscillator wave is applied to each of the demodulators. In the circuit shown, for example, the secondary winding of transformer 28 is coupled via resistor 29 to the anode and cathode of diodes 130 and 131, respectively of the R–Y demodulator 26. The B–Y demodulator 25 is supplied color reference oscillator signal of a different phase via capacitor 30 coupled between the secondary winding of transformer 28 and the series RL network comprising the parallel combination of inductor 31 and resistor 32 in series with the parallel combination of inductor 33 and resistor 34. The junction between capacitor 30 and the above-noted series RL network is coupled to the B–Y demodulator 25 via resistor 35. The output of the R–Y demodulator is available at the junction of resistors 36 and 37 and is coupled to a grid electrode of a pentode amplifier stage 38 which will be described in greater detail subsequently. In a similar manner the output of the B–Y demodulator 25 is developed at the junction between resistors 39 and 40 and is applied to the grid electrode of a pentode amplifier 41 via a series LC network comprising inductor 42 and capacitor 43. The pentode amplifiers 38 and 41 amplify the demodulated color difference signals to a level suitable for application to the grid electrodes of the kinescope 16. To provide the third signal or the G–Y signal, the plate electrode of both the R–Y pentode amplifier 38 and B–Y pentode amplifier 41 are coupled through respective resistors 44 and 45 to the grid electrode of a triode amplifier 46. The magnitudes of resistors 44 and 45 are selected in accordance with the grid circuit impedance of triode 46 to obtain the proper amounts or amplitudes of the R–Y and B–Y signals for the generation of the G–Y signal. Each of the amplifiers thus described is coupled to a separate grid electrode of the three gun kinescope 16. Each coupling circuit to the kinescope grid is similar and, for example, if reference is made to the R–Y circuit, it comprises a capacitor 50 coupled between the plate electrode of the pentode 38 and a terminal of a current limiting resistor 51 having its other terminal coupled to the "red" grid of the kinescope 16. Lu order to provide a suitable bias to the kinescope grids with respect to that bias applied to the kinescope cathodes due to the magnitude of the voltage applied to the cathodes via the direct coupled luminance drive, a DC restoring circuit is associated with each of the grid circuits. The DC restorer circuit for the "red" grid include a diode 52 having its anode electrode connected to the junction between capacitor 50 and resistor 51. The diode is biased by means of a resistor 54 connected between the B+ supply and the anode of diode 52. The cathode of the diode is returned through a resistor 55 to the plate circuit of the blanker amplifier 60.

The blanker amplifier 60 includes a triode device or other active amplifying element having a plate load which comprises the series resistors 61, 62 and 63 coupled between the plate electrode of triode 60 and the B+ operating supply. The cathode electrode of the triode 60 is returned to ground through a resistor 64 and bypassed by a capacitor 65. The cathode electrode of the triode 60 may also be coupled to a low-level chrominance amplifier stage for burst elimination, which in essence cuts off the chrominance amplifier channel during the burst interval to avoid spurious components from being applied to the demodulators. The grid electrode of the triode 60 is keyed on during the blanking interval by means of a positive polarity pulse developed in the horizontal deflection circuits 17. This pulse may be provided by means of a suitable tap on the horizontal flyback transformer, not shown, and serves to key the blanker tube into conduction during the horizontal retrace interval. This causes the voltage at the plate electrode of the triode 60 to go from the B+ level towards ground, thus producing a relatively large negative pulse. This negative pulse is coupled to the cathodes of the diodes, as diode 52, located in the DC restoring circuits. The polarity of the pulse is in a direction to forward bias the diodes causing the coupling capacitors, as 50, to charge to a level indicative of the quiescent value of the demodulators for zero chrominance signal input. The time constant of the RC-network associated with each kinescope grid is sufficient to maintain the charge on the coupling capacitor approximately constant during the line interval, thus properly biasing each grid with respect to its associated cathode to operate the kinescope in a linear region. The above described circuit configuration is similar to that used in the CTC-38 color television receiver manufactured by the RCA Corporation. Further details of the CTC-38 color television receiver may be had by reference to "RCA Television Service Data, Chassis CTC-38 Series," file 1968 No. T-18, published in 1968 by the RCA Sales Corporation, 600 North Sherman Drive, Indianapolis, Ind.

During reception of a monochrome transmission, the pentode driver amplifiers 38 and 41 are cut off by means of the color killer circuit 70 which applies a negative voltage to each of the above-mentioned grid electrodes via resistors 71 and 72. Resistors 71 and 72 are coupled respectively between the grid electrodes of pentodes 38 and 41 and the color killer circuit 70. Briefly, the color killer circuit 70 operates to detect the presence or absence of color bursts representative of a color or monochrome transmission respectively, and provides a potential sufficient to enable or turn on the amplifiers 38 and 41 for a color transmission and to disable or cut off the amplifiers during a monochrome transmission. During color reception the kinescope matrixes the luminance or "Y" signal applied to the cathodes with the color difference signals as applied to the grids to provide the required amplitude blue, red and green signals necessary for the production of the color display.

As indicated above, if the transmission is affected by phase disturbances, the flesh tones may be processed according to the received reference signal with undesirable casts or tints. Disturbances resulting from the propagation errors are unavoidable, and the receiver is correctly responding to an incorrect or improper reference subcarrier oscillator phase. Unfortunately, even with the best reproducing techniques available in the color television receiver, when such phase errors are present, there is nothing one can do with the exception of further manually adjusting the tint control 75 to obtain a better picture than is being displayed. However, as indicated, the attempt at this point to effect a proper tint by varying the phase of the reference color oscillator will provide an incorrect tint, necessitating still another change, during a different portion of the transmission.

To overcome this difficulty the present receiver incorporates a double-pole, double-throw switch 80 having first and second positions. In the first position shown as a dotted line position, the receiver operates in the same manner as the above noted (CTC-38) receiver and will produce full gain demodulation for the B–Y and R–Y channels which can be equated to full I and Q-axis demodulation. Thus, in this mode if the transmission is in fact good, because the propagation path disturbances are minimal, and the broadcaster maintains proper reference levels both in phase and amplitude at the station, the displayed color picture will provide the viewer with correct hue and saturated color including proper presentation of flesh tones. The difficulties due to the differences in propagation paths or to the fact that the studio broadcasters may not set up their transmitters in the same way, result in variations in the burst phase from one station to another or even from one camera to another. In order to obtain a more adequate and pleasant presentation, the switch 80 may be adjusted to the second position or right-hand position.

In this position the parallel combination of inductor 33 and resistor 34 normally shorted to ground is included in the circuit to change the phase of the reference carrier oscillator signal applied to the demodulators. By including inductor 33 and resistor 34 in the circuit, the series combination of these components with inductor 31 and resistor 32 changes the phase of the reference carrier oscillator signal applied to the B–Y demodulator 25. In addition to this action the extra load produced by inductor 33 and resistor 34 alters the tuning of transformer 28 in such a manner as to phase shift the reference carrier supplied to the R–Y demodulator 26. The overall impedance of the phase shift network is made relatively low to enable the use of a shielded cable to the switch 80 which may be remotely located on the front panel of the receiver. The cable is coupled between the junction of the networks 31–32 and 33–34 and the appropriate contact of the switch as shown.

In addition to the foregoing, when the switch 80 is adjusted to its "tint" or right-hand position, a terminal of resistor 82 is grounded. The B–Y of resistor 82 B–Y connected to the junction between inductor 42 and capacitor 43 at the output circuit for the B–Y demodulator. A consequent reduction in the B–Y magnitude is thereby accomplished by the voltage divider action afforded by resistor 82 in conjunction with the output impedance of the B–Y demodulator.

In this manner approximately a 50 percent effective reduction in Q-signal gain is achieved. To explain, in a receiver utilizing R–Y and B–Y demodulation, the R–Y and B–Y signals may be represented by vectors having individual I and Q-components. By changing the effective magnitude of the Q-component associated with the R–Y and B–Y vectors, one obtains a new resultant or a differently phased R–Y and B–Y vector. It can be shown mathematically that a 50 percent Q-channel reduction can be achieved by making the following gain and angle changes in the R–Y and B–Y channels. The original B–Y and B–Y vectors R-*Y*are defined by the following equations:

$$\text{R-YR-Y})=.945I+.621Q=1.13\ 90^\circ \quad \underline{/90^\circ}$$

$$(B\text{–}Y\ )=-1.11I+1.70Q=2.30\ 0^\circ \quad \underline{/0^\circ}$$

The *B–Y* and *B–Y* vectors resulting from the channel gain reduction are as follows:

$$(R\text{–}Y)'=.945I+.3105Q=0.992\ 104^\circ \quad \underline{/104^\circ}$$

$$(B\text{–}Y)'=-1.11I+.850Q=1.39\ -20^\circ \quad \underline{/-20^\circ}$$

These equations show that a 50 percent *Q*-channel gain reduction can be achieved by making the following gain and channel changes in the *R–Y* and *B–Y* channels. Thus:

$$\frac{(R-Y)'}{R-Y}=88\% \qquad \underline{/(R-Y)'-(R-Y)=14^\circ}$$

$$\frac{(B-Y)'}{B-Y}=60\% \qquad \underline{/(B-Y)'-(B-Y)=-20^\circ}$$

The above results are indicated for the general case and may vary within a few degrees or more for different types of receivers employing slightly different demodulation angles. The above-described set up is primarily involved with the *Q*-axis reduction and in essence will provide the viewer with more pleasing flesh tones in spite of phase propagation errors. However, the reduction in the effective *Q*-signal results in a loss of fidelity of reproduction capabilities of the receiver and especially affects the reproduction capability of the receiver in formulating green tones. In order to provide a still more optimum response, when the switch 80 is placed in the right-hand position, thus giving the consumer the reduced *Q*-signal gain, another operation occurs simultaneously. In order to obtain a better response to the green color signals in the half-*Q* mode of operation, the color temperature is changed by lowering the bias on the blue grid electrode of the kinescope. The bias as lowered is in a direction to reduce the reproduction of blue colors during the half-*Q* mode which sets the color temperature of image at about 6800° K. Such a setting tends to provide a pinkish white cast in lieu of the normal blue-white cast having a color temperature of approximately 9300° K. The alteration afforded by color temperature compensation during the effective half-*Q* mode reduces the blue gun conduction which in turn permits better response to green signals. The result also serves to decrease the saturation of the blue signals, but not accompanied by a substantial hue change and hence blue is still displayed as blue. This technique with the half*Q* system gives a good compromise between faithful flesh tone reproduction while maintaining proper hue for greens and blues in spite of phase errors in the propagation path or in the signal.

The circuitry for effecting the color temperature switching will now be described. A negative pulse is available at the plate circuit of the blanker tube 60 appears at a tap on potentiometer 62 forming part of the plate load for the blanker triode circuit 60. The negative pulse is coupled via resistor 90 to the grid electrode of the *B–Y* driver pentode 41 via resistor 92 and to the cathode electrode of the *R–Y* driver pentode 38 via resistor 93. The amplitude of this pulse, determined by the setting of potentiometer 62, operates, in combination with the kinescope drive adjust 21, to set the required grid to cathode bias of the kinescope as determined by the particular screen voltage. The negative pulse produced in the blanker plate circuit as coupled to the cathode of pentode 38 causes the pentode to conduct harder during the blanking period, thus causing capacitor 50 to charge up less so that a less negative voltage is impressed on the red grid of the kinescope 16. The negative pulse coupled to the grid circuit of vacuum tube 41 causes the blue kinescope grid voltage to decrease or go more negative. Since the desired color temperature change to 6800° K. is produced by a decrease in the ratio of blue to red light output of the kinescope, the above described pulse injection scheme provides the desired results. In order to produce the color temperature change described above in the particular receiver shown in the FIGURE, it was necessary to leave the green light output of the kinescope essentially unaltered after the pulses were injected into the *R–Y* and *B–Y* color difference amplifiers. Since the G–Y signal as described above is derived entirely from the *R–Y* and *B–Y* amplifiers, any pulse injection into either the *R–Y* or *B–Y* stages 38 and 41 tends to produce a change in the *G–Y* kinescope grid voltage by virtue of the coupling of these pulses through the *G–Y matrix output. This pulse would present a problem during monochrome transmission because the G–Y* amplifier is not killed. However, if the amplitude and polarity of the pulses as injected into the *R–Y* and *B–Y* amplifiers are appropriately chosen, by proper selection of resistors 92 and 93, no effect will occur on the DC voltage in the *G–Y* channel because of the cancellation of the pulses. The ratio of the red to blue pulse needed for cancellation in the *G–Y* channel is also correct for providing the desired color temperature shift.

As indicated on the schematic, both the half-*Q* system and the color temperature technique provided can be eliminated by throwing the switch 80 into the normal position which grounds the common terminal between resistors 92 and 93, thus preventing the color temperature pulses being applied to the driver pentodes and simultaneous shorting the RL network of resistor 34 and inductor 33 necessary for the phase shift in the half-*Q* operation. This action further removes the ground from resistor 82 at the output of the blue demodulator, thus permitting the receiver to operate at its original color temperature of 9300° K. with full amplitude *R–Y* and *B–Y* demodulation. It is also noted that when switch 80 is placed in the left-hand position and a monochrome transmission is in progress, the color killer circuit 70 will disable the pentodes 38 and 41, thus operating the kinescope at a color temperature of 9300° K. by preventing the pulses applied via the blanker circuit from coupling to the DC restoring circuits.

PARTS LIST

A circuit using the following components operated to provide the above described features:

| | |
|---|---|
| Resistors 36, 37, 39, 40 | 8,200 ohms |
| Resistor 29 | 220 ohms |
| Resistor 35 | 220 ohms |
| Resistor 32 | 130 ohms |

| | |
|---|---|
| Resistor 34 | 56 ohms |
| Resistor 44 | 100,000 ohms |
| Resistor 45 | 150,000 ohms |
| Resistor 51 | 1,000 ohms |
| Resistor 54 | 2.2 megohms |
| Resistor 55 | 56,000 ohms |
| Resistor 61 | 5,600 ohms |
| Resistor 62 | 3,000 ohms |
| Resistor 63 | 10,000 ohms |
| Resistor 64 | 1,000 ohms |
| Resistor 71 | 1 megohm |
| Resistor 72 | 1 megohm |
| Resistor 75 | 2.5 K |
| Resistor 90 | 150,000 ohms |
| Capacitor 30 | 330 micromicrofarads |
| Capacitor 43 | 0.047 microfarads |
| Capacitor 50 | 0.01 microfarads |
| Capacitor 65 | 820 micromicrofarads |
| Inductor 31 | 6.8 microhenries |
| Inductor 33 | 8.2 microhenries |
| Inductor 42 | 620 microhenries |
| Vacuum tubes | |
| pentode 38 | 6CB6A |
| pentode 41 | 1/2 6GH8A |
| triode 46 | 1/2 6GH8A |
| triode 60 | 1/2 6GH8A |

What is claimed is:

1. In a color television receiver for monochrome television signals or NTSC color television signals including a color carrier modulated by I and Q-signals, said receiver including a color image reproducing device, means for deriving from said color carrier a plurality of color signals related to said I and Q-signal at a first amplitude version and with a reduced amplitude version of said Q signals;

means for selectively applying said color signals to said color image reproducing device;

means for biasing said color image reproducing device to produce an image having a first predetermined color temperature, and a second reduced color temperature;

and switching means coupled to said deriving means and to said biasing means and manually controllable for switching said receiver between:

a. a first condition wherein the character of said color signals is substantially representative of said I and Q-signals, and said color temperature is said predetermined color temperature, and b. a second condition wherein the character of said color signals is representative of said I-signal and said reduced amplitude version of said Q-signal, and said color temperature is reduced to said value below said predetermined color temperature.

2. In a color television receiver for a television signal containing luminance, chrominance and synchronizing information, said receiver including a luminance channel for amplifying said luminance information and a chrominance channel for processing said chrominance information and for retrieving a burst reference signal transmitted with said television signal and using said burst signal to synchronize an oscillator to produce an oscillator wave, said oscillator wave being applied at a different phase to at least two demodulator circuits, each of said demodulators having another input responsive to said processed chrominance signals, said demodulators providing first and second signals representative of at least first and second color signals, said receiver including a kinescope responsive to said luminance information and said demodulated color signals to provide a color display at a given color temperature determined by the biasing of said kinescope and operative to provide said given color temperature for both said color transmission and a monochrome transmission, apparatus for providing an improved display presentation during a color transmission associated with undesired phase errors of said chrominance information which phase errors adversely effect the reproduction of said color information, comprising, a. first means coupled to said chrominance channel and operative during a color transmission for altering the characteristics of said color signals to affect the output of at least one of said demodulators, b. means responsive to the operation of said first means for lowering the color temperature of said kinescope from said given color temperature only during a color transmission, whereby said given color temperature is still utilized during said monochrome transmission.

3. In a color television receiver for a television signal containing luminance, chrominance, and synchronizing information, said receiver including a luminance channel for responding to and amplifying said luminance information and a chrominance channel for processing said chrominance information and for retrieving a burst reference signal transmitted with said television signal and applying said burst to synchronize an oscillator circuit, means coupled to said oscillator circuit for applying said synchronized signal at a different phase with respect to one another to an input of at least two demodulator circuits, having another input responsive to said processed chrominance signals, said demodulators operative to demodulate said chrominance signals at a given angle there between determined by said different phase oscillator signal applied thereto for providing first and second signals representative of at least first and second color signals, said receiver further including a kinescope responsive to said luminance and demodulated chrominance information for providing a color display presentation during said transmission according to the information content of said signal at a relatively standard color temperature, apparatus for providing an improved display presentation during a transmission associated with undesired phase errors which errors adversely affect the reproduction of color information, comprising, a. first means selectively coupled to said demodulator circuits during a color transmission for changing said angle of said demodulation from said given angle, b. means coupled to said kinescope responsive to the selection of said first means for reducing the color temperature of said display below said standard temperature, whereby said demodulator angle change of said demodulators with said decrease of said color temperature results in an improved display presentation relatively independent of said undesired phase errors.

4. A color television receiver apparatus for responding to a transmitted composite television signal including luminance, chrominance and synchronizing information, said receiver including a color kinescope operative to provide a display in accordance with the information contained in said signal and having a plurality of control electrodes biased to operate said kinescope display at a given color temperature for both a color and a monochrome transmission comprising, a. separator means responsive to said television signal for retrieving a burst signal therefrom indicative of the phase and frequency utilized at said transmitter to generate said chrominance information, b. means coupled to said separator means to provide a continuous signal synchronized to said retrieved burst signal, c. at least first and second demodulator circuits having one input terminal responsive to said chrominance information and a second input terminal coupled to said means and adapted to receive said continuous signal at a given, different phase relationship from one another selected in accordance with a desired demodulation arrangement, d. a plurality of circuit means each having an input terminal coupled to a separate one of said demodulator circuits and an output terminal coupled to a separate one of said biased control electrodes of said kinescope, e. selectively operated means coupled to said demodulator circuits for altering the phase of said continuous wave signal as applied thereto to provide a second different phase relationship therebetween, f. means responsive to said selectively operative means being operated to alter the bias on said kinescope electrodes in a direction to lower said color temperature from said given color temperature.

5. The apparatus according to claim 4 wherein one of said inputs of said first and second demodulators adapted to receive said continuous wave signal includes a first phase shifting network to enable demodulation at the ($R-Y$) and (B-Y) vectors, wherein the angular difference between said vectors is approximately 90°.

6. The apparatus according to claim 5 further including, ($B-Y$) a second phase shifting network in series with said first phase shifting network and having a terminal thereof coupled to a point of reference potential, b. a switch in shunt with said second phase shifting network having a first closed position for shorting said second phase shifting network to said point of reference potential and a second opened position for including said second phase shifting network to alter said phase of said continuous wave signal as applied to said demodulators in a direction to increase the angle between said ($R-Y$) and ($B-Y$) vectors. .

7. The color television receiver apparatus according to claim 4, wherein said selectively operated means further includes, a. means for simultaneously altering the output amplitude of at least one of said demodulator circuits to reduce the signal applied to said one of said circuit means associated therewith.

8. The television receiver according to claim 7, wherein said means included in said selectively operated means comprises:

a. an impedance element having first and second terminals, and having said first terminal coupled to said output terminal of one of said demodulators, b. switching means having a first terminal coupled to said second terminal of said impedance element and a common terminal coupled to a point of reference potential, whereby when said switching means are operated in a first position said impedance shunts said output terminal of said demodulator to reduce the amplitude of an output signal developed thereby.

9. The television receiver according to claim 7, wherein one of said inputs of said first and second demodulators adapted to receive said continuous wave signal includes said first phase shifting network to enable demodulation at the ($R-Y$) and ($B-Y$) vectors, wherein the angular difference between said vectors is approximately ninety degrees.

10. The apparatus according to claim 7 further comprising, a. a second phase shifting network in series with said first phase shifting network and having a terminal thereof coupled to a point of reference potential, b. a switch in shunt with said second phase shifting network having a normally closed position for shorting said second phase shifting network to said point of reference potential and a normally opened position for including said second phase shifting network to alter said phase of said continuous wave signal as applied to said demodulator in a direction to increase the angle between said ($R-Y$) and ($B-Y$) vectors.

11. The color television receiver according to claim 7, wherein said plurality of circuit means each comprises, a. an amplifier having input, output and common electrodes, b. means coupling said input electrode to one of said demodulator circuits, c. a capacitor coupling said output electrode to one of said kinescope electrodes, d. a direct current restoring network coupled to the junction between said capacitor and said kinescope electrode, and operative during a recurring interval associated with said synchronizing information to charge said capacitor to a predetermined level for biasing said electrode at a level sufficient to operate said kinescope at said given color temperature.

12. The color television receiver according to claim 11, wherein said means responsive to said selectively operative means being operated, comprises, a. means coupled between said input and common electrodes of said amplifier for injecting a pulse therebetween of a sufficient amplitude and duration and occurring during said recurring interval for altering said biasing on said kinescope electrode in a direction to lower said color temperature from said given color temperature.

* * * * *

UNITED STATES PATENT OFFICE
CERTIFICATE OF CORRECTION

Patent No. 3,617,621 Dated 11-2-71

Inventor(s) Larry Allen Cochran

It is certified that error appears in the above-identified patent and that said Letters Patent are hereby corrected as shown below:

Column 3, Line 47, delete "Lu" and insert -- In -- . Column 5, Line 18, delete "The B-Y of resistor 82 B-Y" and insert -- The other terminal of resistor 82 is -- . Column 5, Line 35, delete "B-Y" first occurrence and insert -- R-Y --. Column 5, Line 35, after "vectors" delete -- R-Y --. Column 5, Line 37, delete "R-YR-Y)" and insert -- (R-Y) --. Column 5, Line 37, after "1.13" delete -- 90° -- first occurrence. Column 5, Line 38, after "2.30" delete -- 0° -- first occurrence. Column 5, Line 39, delete "B-Y" first occurrence and insert -- R-Y --. Column 5, Line 41, after ".992" delete -- 104° -- first occurrence. Column 5, Line 42, after "1.39" delete -- 20° -- first occurrence. Column 9, Line 6, delete "(B-Y)" and insert -- a. --.

Signed and sealed this 16th day of May 1972.

(SEAL)
Attest:

EDWARD M.FLETCHER, JR.
Attesting Officer

ROBERT GOTTSCHALK
Commissioner of Patents